United States Patent
Heo et al.

(10) Patent No.: US 9,179,287 B2
(45) Date of Patent: Nov. 3, 2015

(54) APPARATUS AND METHOD FOR MANAGING MEMORY OF MOBILE TERMINAL

(71) Applicant: Samsung Electronics Co., Ltd., Gyeonggi-do (KR)

(72) Inventors: Changryong Heo, Gyeonggi-do (KR); Kenhyung Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/166,314

(22) Filed: Jan. 28, 2014

(65) Prior Publication Data

US 2014/0213240 A1    Jul. 31, 2014

(30) Foreign Application Priority Data

Jan. 29, 2013  (KR) .................. 10-2013-0009789

(51) Int. Cl.
*H04M 3/00* (2006.01)
*H04W 8/08* (2009.01)
*G06F 9/50* (2006.01)
*H04W 52/02* (2009.01)
*G06F 1/32* (2006.01)

(52) U.S. Cl.
CPC .............. *H04W 8/08* (2013.01); *G06F 1/3293* (2013.01); *G06F 9/5094* (2013.01); *H04W 52/0209* (2013.01); *Y02B 60/121* (2013.01); *Y02B 60/142* (2013.01)

(58) Field of Classification Search
CPC ............ H04W 8/245; H04M 1/72519; H04M 1/72522; G06F 1/3203
USPC ................ 455/418, 550.1, 556.1; 713/323
See application file for complete search history.

(56) References Cited

U.S. PATENT DOCUMENTS

| | | |
|---|---|---|
| 2003/0084194 A1 | 5/2003 | Ryan |
| 2008/0148083 A1* | 6/2008 | Pesavento et al. ............ 713/322 |
| 2012/0284550 A1* | 11/2012 | Park .............................. 713/323 |
| 2013/0073812 A1* | 3/2013 | Kanai et al. ................... 711/141 |
| 2013/0304981 A1* | 11/2013 | Paz .............................. 711/105 |

FOREIGN PATENT DOCUMENTS

| | | |
|---|---|---|
| KR | 10-2009-0091228 A | 8/2009 |
| KR | 10-0971870 B1 | 7/2010 |

* cited by examiner

*Primary Examiner* — Danh Le

(74) *Attorney, Agent, or Firm* — Cha & Reiter, LLC.

(57) ABSTRACT

This disclosure relates to an apparatus and method for managing the memory of a mobile terminal. The mobile terminal includes a main system that operates with normal power, and a subsystem that operates with low power. The subsystem operates at least one feature of the mobile terminal while the main system is in a sleep mode. Binary data may be used to operate the at least one feature of the mobile terminal. When binary data is stored in memory operatively coupled to the main system, the binary data is retrieved and copied to memory operatively coupled to the subsystem, allowing the subsystem to operate the feature while the main system is in sleep mode.

15 Claims, 7 Drawing Sheets

| FUNCTION | START ADDRESS | END ADDRESS |
|---|---|---|
| LIBRARY-1 | 0x00010000 | 0x0001FFFF |
| LIBRARY-2 | 0x00020000 | 0x0002EEEE |
| LIBRARY-3 | 0x0002EEEF | 0x00031000 |
| FUNCTION-1 | 0x00031001 | 0x0003FFFF |
| FUNCTION-2 | 0x00040000 | 0x00042000 |
| ... | | | official title

APPARATUS AND METHOD FOR MANAGING MEMORY OF MOBILE TERMINAL

CROSS REFERENCE TO RELATED APPLICATION

This application claims the benefit under 35 U.S.C. §119(a) of a Korean patent application filed on Jan. 29, 2013 in the Korean Intellectual Property Office and assigned Serial No. 10-2013-0009789, the entire disclosure of which is hereby incorporated by reference.

TECHNICAL FIELD

The present disclosure relates to communication equipment, and, more particularly to an apparatus and method for managing the memory of an electronic device.

BACKGROUND

Remarkable development of information communication technology and semiconductor technology increases the spread and use of a mobile terminal dramatically. A mobile terminal provides a variety of functions, such as a call function, a music playback function, a text message transmission/reception function, a digital broadcasting reception function, a local distance wireless communication function, and an Internet access function.

In general, a mobile terminal uses a battery for portability. Since the amount of current charged in the battery is limited, a scheme for reducing the current consumption of the mobile terminal becomes an important issue in the mobile terminal field. A scheme for reducing current consumption may include a scheme for additionally constructing a system for controlling sensors included in the mobile terminal 100 with low power irrespective of the state of an Application Processor (AP) mounted on the mobile terminal. A consumed current can be reduced because the sensor system performs a function while operating with low power in the state in which the AP has entered a sleep mode.

When the sensor system was initially introduced, the sensor system chiefly performed operations, such as the logging of sensor data and the wake-up of the mobile terminal that entered a sleep mode. Future sensor systems included in mobile terminals need to perform new operations, such as location-based service using Pedestrian Dead Reckoning (PDR) and Bluetooth Low Energy (BLE) tag monitoring. However, there is a problem in that a new scenario that will occur in the future is not satisfied because the memory capacity of a sensor system is limited for various reasons, such as consumption current and a cost.

SUMMARY

The disclosure may provide an apparatus and method for managing the memory of a mobile terminal, wherein binary data for a subsystem stored in memory used in a main system is copied to memory used in the subsystem in response to a binary data request in the mobile terminal equipped with the main system and the subsystem operating with low power.

In accordance with an aspect of this disclosure, a memory management apparatus of a electronic device, including a main system including a first processor and a first memory, the main system configured to enter into a sleep mode; and a sub system including a second processor and a second memory, the sub system configured to: detect whether an instruction necessary to operate a function of the electronic device is stored in the second memory, in response to a failure to detect the instruction, cause at least a portion of the main system to temporarily exit the sleep mode, and transfer the instruction from the first memory to the second memory, and operate the function of the electronic device according to the instruction while the main system is in the sleep mode; wherein the sub system utilizes less power than the main system.

In accordance with another aspect of this disclosure, a memory management method of a electronic device includes activating a sleep mode for a main system having a first memory; detecting, via a sub system having a second memory, whether an instruction necessary to operate a function of the electronic device is stored in the second memory; in response to a failure to detect the instruction, causing, via the sub system, at least part of the main system to temporarily exit the sleep mode and transfer the instruction from the first memory to the second memory; and operating, via the sub system, the function according to the instruction while the main system is in the sleep mode, wherein the sub system utilizes less power than the main system.

In accordance with another aspect of this disclosure, a computer medium for managing memory in an electronic device, comprising program instructions executable by a processor to: activate a sleep mode for a main system having a first memory; detect, via a sub system having a second memory, whether an instruction necessary to operate a function of the electronic device is stored in the second memory; in response to a failure to detect the instruction, cause, via the sub system, at least part of the main system to temporarily exit the sleep mode and transfer the instruction from the first memory to the second memory; and operate, via the sub system, the function according to the instruction while the main system is in the sleep mode, wherein the sub system utilizes less power than the main system.

BRIEF DESCRIPTION OF THE DRAWINGS

FIG. 6 is a diagram illustrating an example of a memory management process in accordance with an embodiment of this disclosure.

DETAILED DESCRIPTION

Hereinafter, example embodiments of this disclosure are described in detail with reference to the accompanying drawings. It is to be noted that the same reference numbers are used throughout the drawings to refer to the same elements. Furthermore, a detailed description of known functions or constructions that are known in the art may be summarized, rather than described in depth, for the sake of clarity and brevity. In accordance with an embodiment of this disclosure, a mobile terminal includes a first system (main system) and a second system (subsystem). The first system (main system) refers to a system for controlling the overall operation of functions of the mobile terminal, such as call processing and the playback of multimedia content. The first system may include a first processor, a Direct Memory Access (DMA) controller, a first memory, etc. The DMA controller controls the movement of data between memories when a processor does not use a system bus. Since a large amount of current is consumed if the processor directly controls the movement of data between the memories, the DMA controller controls the movement of data based on a source address, a destination address, and the amount of data to be transmitted, which are provided to the DMA controller.

Furthermore, the second system (subsystem) refers to a system for controlling the operations of mobile terminal functions, such as the detection of surroundings of the mobile terminal, such as illuminance, humidity, atmospheric pressure, and temperature, the storage of detected data, and the wake-up of the first system (main system) based on the detected surroundings in the state in which the first system (main system) has entered a sleep mode. The second system (subsystem) includes a second processor, a second memory, etc. The second system (subsystem) may operate when the first system (main system) is in an active mode.

Furthermore, the second system (subsystem) controls periodically or intermittently executed operations in place of the first system (main system) which consumes a large amount of current. In general, the second system (subsystem) operates independently from the first system (main system) and with low power. Accordingly, a low-power processor, such as a Micro Processor Unit (MPU) or a Micro Control Unit (MCU), is used as the second processor. In contrast, for a smooth operation of a function provided by the mobile terminal, a high-performance processor, such as an Application Processor (AP), is used as the first processor.

The internal structure of the mobile terminal in terms of the function in accordance with an embodiment of this disclosure is described in detail with reference to FIG. 1.

Figure 1:
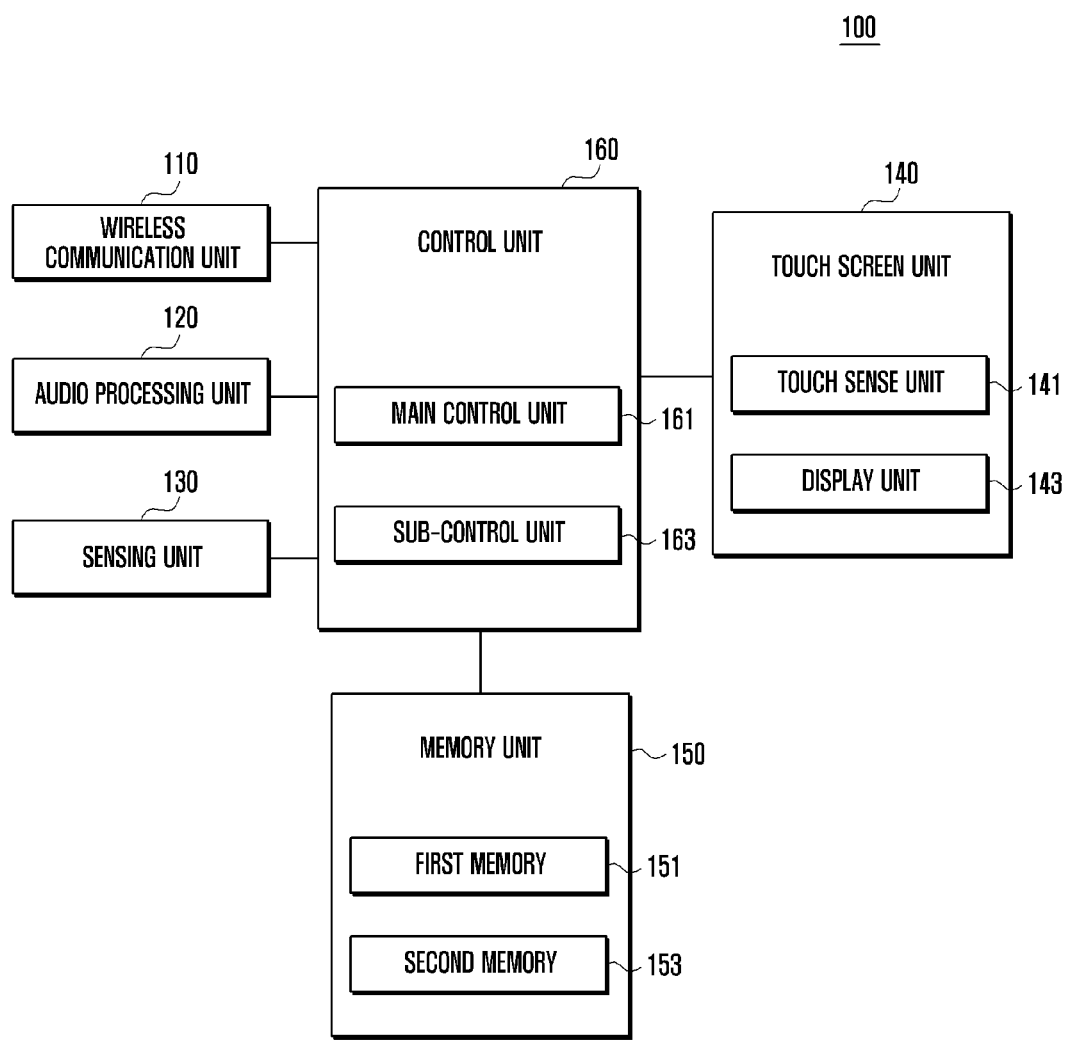
FIG. 1 is a block diagram illustrating the internal structure of an example mobile terminal 100 in accordance with an embodiment of this disclosure.

FIG. 1 is a block diagram illustrating the internal structure of the mobile terminal 100 in accordance with an embodiment of this disclosure.

Referring to FIG. 1, the example mobile terminal 100 in accordance with an embodiment of this disclosure may include a wireless communication unit 110, an audio processing unit 120, a sensing unit 130, a touch screen unit 140, a memory unit 150, and a control unit 160.

The wireless communication unit 110 performs a function for transmitting and receiving corresponding data for the wireless communication of the mobile terminal 100. The wireless communication unit 110 may include an RF transmitter for performing up-conversion and amplification on a frequency of a transmitted signal and an RF receiver for performing low-nose amplification on a received signal and performing down-conversion on a frequency of the received signal. Furthermore, the wireless communication unit 110 can receive data through a wireless channel, output the data to the control unit 160, and send data output from the control unit 160 through a wireless channel.

The audio processing unit 120 may include a codec. The codec may include a data codec for processing packet data and an audio codec for processing an audio signal, such as voice. The audio processing unit 120 converts a digital audio signal into an analog audio signal through the audio codec, plays back the analog audio signal through a speaker SPK, and converts an analog audio signal, received from a microphone MIC, into a digital audio signal through the audio codec.

The sensing unit 130 detects the surroundings of the mobile terminal 100. The sensing unit 130 can provide the control unit 160 with sensor data corresponding to the surroundings of the mobile terminal 100 in the state in which the mobile terminal 100 has entered a sleep mode. To this end, the sensing unit 130 may be equipped with an accelerator sensor, a motion sensor, a geomagnetic sensor, a temperature sensor, a humidity sensor, an atmospheric pressure sensor, a pressure sensor, and a gravity sensor.

The touch screen unit 140 includes a touch sense unit 141 and a display unit 143. The touch sense unit 141 and the display unit 143 are configured to have a mutual layer structure. The touch sense unit 141 converts pressure, applied to a specific portion of the display unit 143 or a change of capacitance generated from a specific portion, into an electrical input signal. Here, the touch sense unit 141 can detect pressure when a touch is performed in addition to a touched location and area.

That is, the touch sense unit 141 detects touch input from a user, generates a sensing signal, and transfers the sensing signal to the control unit 160. The sensing signal may include information about coordinates touched by a user. If a user performs a movement (i.e., drags) in a touch state, the touch sense unit 141 generates a sensing signal including information about coordinates for the movement path and transfers the sensing signal to the control unit 160.

The touch sense unit 141 may include a touch sensor that adopts a capacitive overlay method, a resistive overlay method, a surface acoustic wave method, or an infrared beam method or may include a pressure sensor. In addition to such sensors, the touch sense unit 141 of this disclosure may include all types of sensors capable of detecting a contact or pressure of an object.

The display unit 143 visually provides a user with the menus of the mobile terminal 100, input data, function setting information, and pieces of other information. The display unit 143 performs a function for outputting the booting screen, standby screen, menu screen, call screen, and other application screens of the mobile terminal 100.

The display unit 143 may be implemented utilizing, for example, a Liquid Crystal Display (LCD), Organic Light Emitting Diodes (OLED), Active Matrix Organic Light Emitting Diodes (AMOLED), a flexible display, or a 3-D display.

The memory unit 150 functions to store programs and data relevant for operations of the mobile terminal 100. The memory unit 150 can be divided into a program region and a data region. The program region can store a program for controlling the overall operation of the mobile terminal 100, an Operating System (OS) for booting up the mobile terminal 100, an application for playing back multimedia content, and an application for other option functions of the mobile terminal 100, such as a spoken-dialog function, a camera function, a sound playback function, and a function for an image or video playback function. The data region is a region in which data generated when the mobile terminal 100 is used is stored, and images, video, a phonebook, and audio data can be stored in the data region.

In particular, the memory unit 150 in accordance with this disclosure includes a first memory 151 and a second memory 153. The first memory 151 and the second memory 153 may be implemented utilizing Static Random Access Memory (SRAM), Dynamic Random Access Memory (DRAM), etc.

The first memory 151 stores programs and data for the operations of the first system (main system), data generated while the first system (main system) operates, and binary data for the operations of the second system (subsystem). The second memory 153 stores programs and data for the operations of the second system (subsystem) and data generated while the second memory 153 operates. That is, memory used in the first processor of the first system (main system) and memory used in the second processor of the second system (subsystem) are classified as the first memory 151 and the second memory 153. Accordingly, in the state in which the first system (main system) has entered a sleep mode, sensor data generated while the second system (subsystem) operates can be stored in the second memory 153.

The control unit 160 controls the overall operation of the elements of the mobile terminal 100. The control unit 160 copies binary data for the second system (subsystem), stored in the first memory 151 used in the first system (main system), to the second memory 153 used in the second system (subsystem) in response to a binary data request from the second system (subsystem). To this end, the control unit 160 in accordance with an embodiment of this disclosure can further include a main control unit 161 and a sub-control unit 163.

The main control unit 161 includes the first processor, the DMA controller, etc. and controls the overall operation of the first system (main system). In particular, the main control unit 161 copies binary data corresponding to a request from the sub-control unit 163, from binary data for the second system (subsystem) stored in the first memory 151, to the second memory 153 in response to the request.

The sub-control unit 163 includes the second processor, etc. and controls the overall operation of the second system (subsystem). In particular, if binary data is not present in the second memory 153 during operation, the sub-control unit 163 requests the binary data from the main control unit 161.

A memory management process in accordance with an embodiment of this disclosure is described below with reference to FIG. 2.

Figure 2:
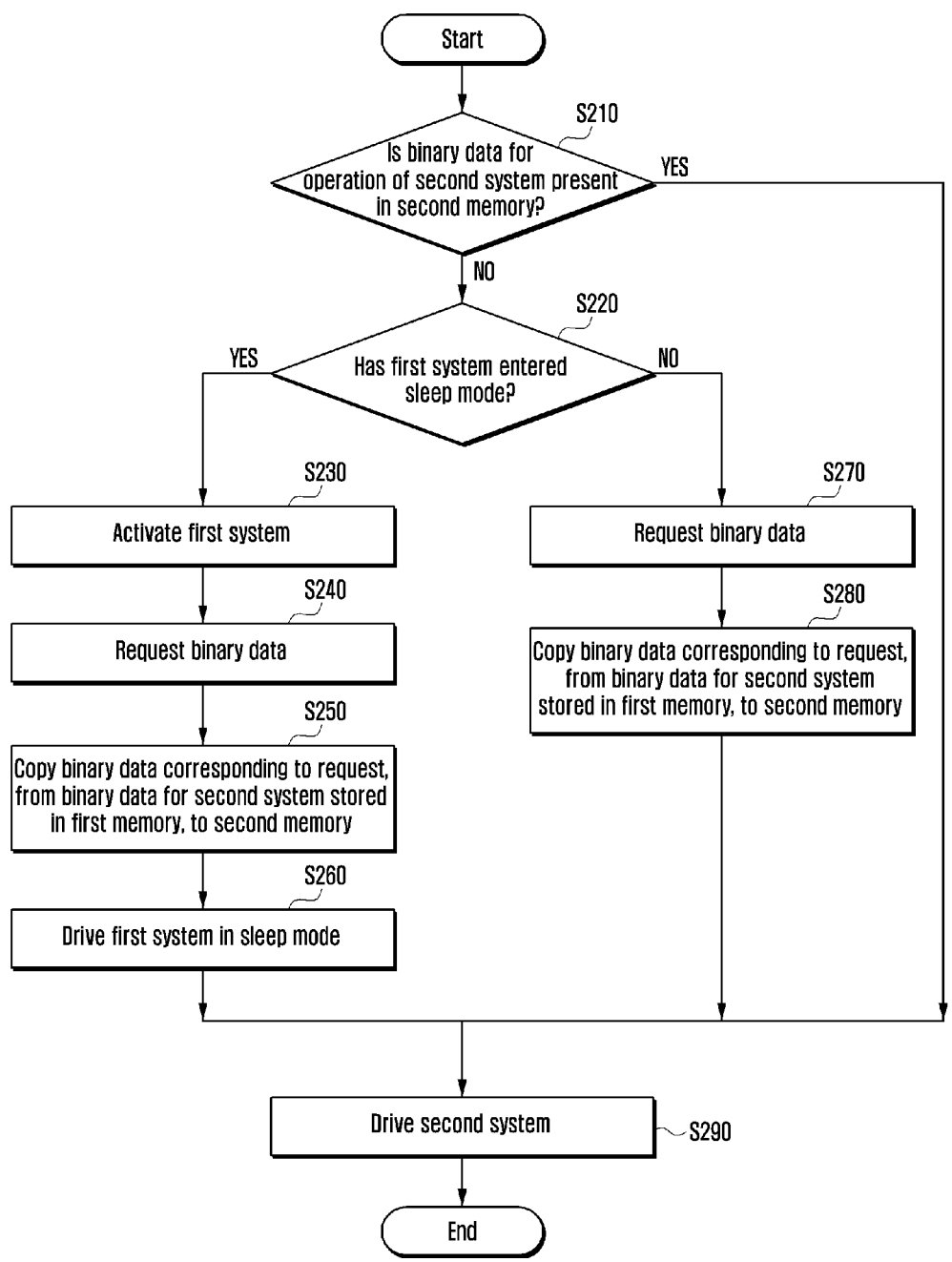
FIG. 2 is a flowchart illustrating an example memory management process in accordance with an embodiment of this disclosure.

FIG. 2 is a flowchart illustrating the memory management process in accordance with an embodiment of this disclosure.

Referring to FIG. 2, the sub-control unit 163 determines whether or not binary data for an operation of the second system (subsystem) is present in the second memory 153 at operation S210. Here, the sub-control unit 163 may determine whether or not binary data corresponding to a function is present in the second memory 153 using a second table stored in the second memory 153. The second table is a table indicating whether or not binary data corresponding to a function used in an operation of the second system (subsystem) is stored in the second memory 153. For example, the second table may include information capable of identifying functions, such as libraries and functions, and entry items consisting of information about physical addresses at which data is stored. If it is desirable to perform a function 'A' while the second system (subsystem) operates, the sub-control unit 163 may determine whether or not binary data corresponding to the function 'A' is present in the second memory 153 using the second table stored in the second memory 153.

If it is determined that the binary data is not present in the second memory 153 at operation S210-NO and the first system (main system) has not entered a sleep mode at operation S220-NO, the sub-control unit 163 requests the binary data from the main control unit 161 at operation S270. That is, the sub-control unit 163 can request the binary data from the main control unit 161 by providing the main control unit 161 with information capable of identifying a function corresponding to the binary data.

In response to the request, the main control unit 161 copies the binary data corresponding to the request of the sub-control unit 163, from binary data for the second system (subsystem) stored in the first memory 151, to the second memory 153 at operation S280. That is, the main control unit 161 can copy the binary data corresponding to the function identification information received from the sub-control unit 163, from the binary data for the second system (subsystem) stored in the first memory 151, to the second memory 153.

Here, the main control unit 161 can copy the binary data corresponding to the function identification information received from the sub-control unit 163, from the binary data for the second system (subsystem) stored in the first memory 151, to the second memory 153 based on a first table stored in the first memory 151. In the first table, physical memory addresses of the binary data are mapped to functions used in the operations of the second system (subsystem). For example, the first table may include information capable of identifying functions, such as libraries and functions, and entry items consisting of start addresses at which binary data is stored and end addresses at which binary data is stored. The main control unit 161 searches for a start address and an end address at which the binary data corresponding to the function 'A' requested by the sub-control unit 163 is stored using the first table stored in the first memory 151. Furthermore, the main control unit 161 copies the binary data corresponding to the function 'A' to the second memory 153 through the first processor or the DMA controller based on the retrieved start address and end address.

In contrast, if it is determined that the binary data is not present in the second memory 153 at operation S210-NO and the first system (main system) has entered a sleep mode at operation S220-YES, the sub-control unit 163 activates the first system (main system) by sending a wake-up signal to the main control unit 161 at operation S230. Here, the sub-control unit 163 may activate at least one of the first processor and the DMA controller. Next, the sub-control unit 163 requests the binary data from the main control unit 161 at operation S240.

In response to the request, the main control unit 161 copies the binary data corresponding to the request of the sub-control unit 163, from the binary data for the second system (subsystem) stored in the first memory 151, to the second memory 153 at operation S250. That is, the main control unit 161 can copy the binary data requested by the sub-control unit 163 to the second memory 153 through the first processor or the DMA controller. Next, the main control unit 161 drives the first system (main system) in the sleep mode again at operation S260.

If the binary data has been copied to the second memory 153 or it is determined that the binary data is present in the second memory 153 at operation S210-YES, the sub-control unit 163 drives the second system (subsystem) at operation S290. Here, the sub-control unit 163 updates the second table stored in the second memory 153.

An example of a connection structure between the first system and the second system in accordance with an embodiment of this disclosure is described below with reference to FIG. 3.

Figure 3:
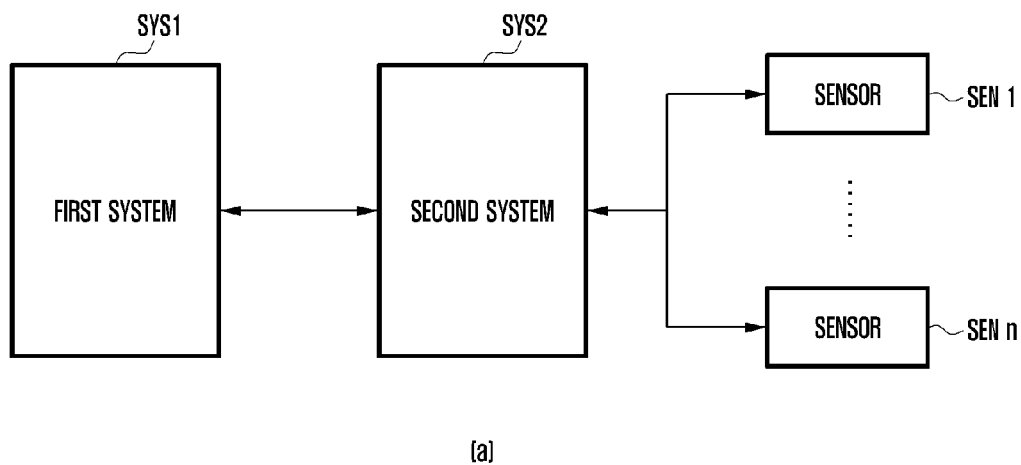
FIG. 3 is a diagram illustrating an example of a connection structure between a first system and a second system in accordance with an embodiment of this disclosure.
Figure 3:
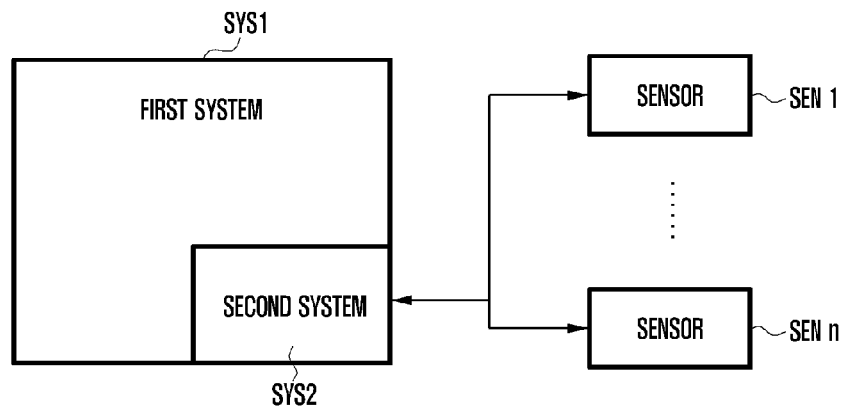

FIG. 3 is a diagram illustrating an example of a connection structure between the first system and the second system in accordance with an embodiment of this disclosure.

In a first example of a connection structure between a first system SYS1 and a second system SYS2 in accordance with an embodiment of this disclosure, as shown in FIG. 3(a), the first system SYS1 and the second system SYS2 may be independently configured, and a plurality of sensors SEN1 to SENn may be connected to the second system SYS2. The first system SYS1 and the second system SYS2 may be connected through a serial interface, such as an Inter-Integrated Circuit (I2C) or a Serial Peripheral Interface (SPI).

In a second example of a connection structure between the first system SYS1 and the second system SYS2 in accordance with an embodiment of this disclosure, as shown in FIG. 3(b), the second system SYS2 may be configured within the first system SYS1, and the plurality of sensors SEN1 to SENn may be connected to the second system SYS2. The first system SYS1 and the second system SYS2 may be connected through a bus interface, such as an Advanced eXtensible Interface (AXI), an Advanced High-performance Bus (AHB), or an Advanced Peripheral Bus (APB).

The memory management operation in accordance with an embodiment of this disclosure may be applied to both the aforementioned connection structures, but hereinafter the memory management operation is assumed to be applied to the connection structure of FIG. 3(b), for convenience of description.

The connection structure between the first system and the second system shown in FIG. 3(b) is described in detail below with reference to FIG. 4.

Figure 4:
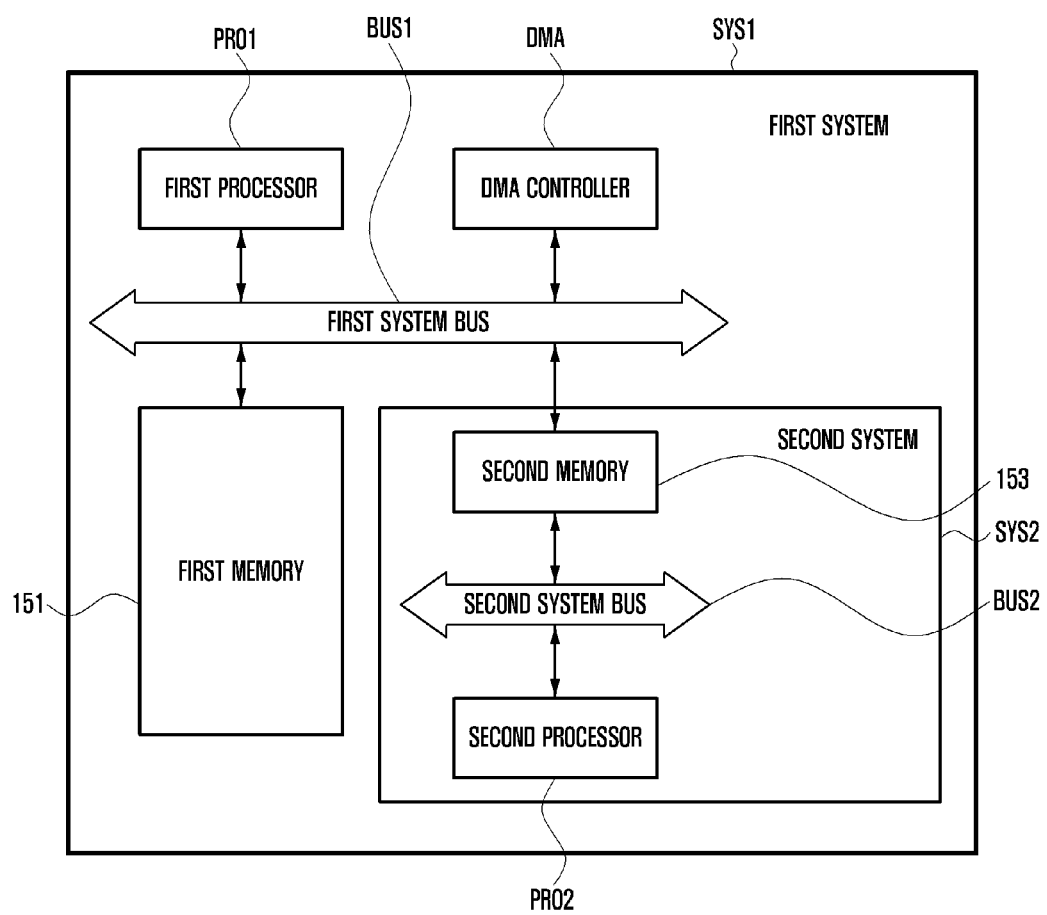
FIG. 4 is a detailed diagram illustrating an example connection structure between the first system and the second system shown in FIG. 3(b)

FIG. 4 is a detailed diagram of the connection structure between the first system and the second system shown in FIG. 3(b).

Referring to FIG. 4, the second system SYS2 is configured within the first system SYS1. The first processor PRO1, the DMA controller DMA, the first memory 151, and the second memory 153 are connected through a first system bus BUS1. Furthermore, the second memory 153 and the second processor PRO2 are connected through a second system bus BUS2.

The first processor PRO1 or the DMA controller DMA reads binary data, requested by the second processor PRO2, from the first memory 151 through the first system bus BUS1 and copies the read binary data to the second memory 153. The second processor PRO2 reads the copied binary data from the second memory 153 through the second system bus BUS2 and performs a corresponding function.

An example of a memory management process in accordance with an embodiment of this disclosure is described in detail below with reference to FIGS. 5 to 7.

Figure 5:
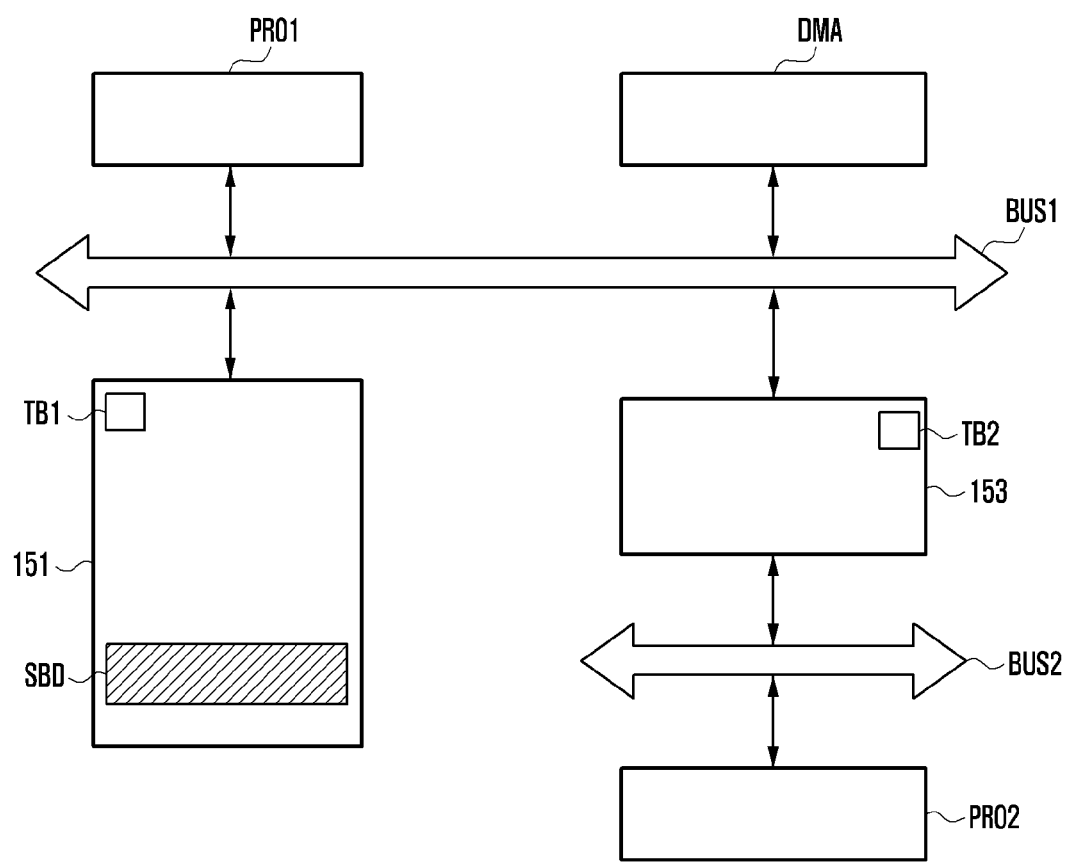
FIG. 5 is a diagram illustrating an example of a memory management process in accordance with an embodiment of this disclosure.
Figure 7:
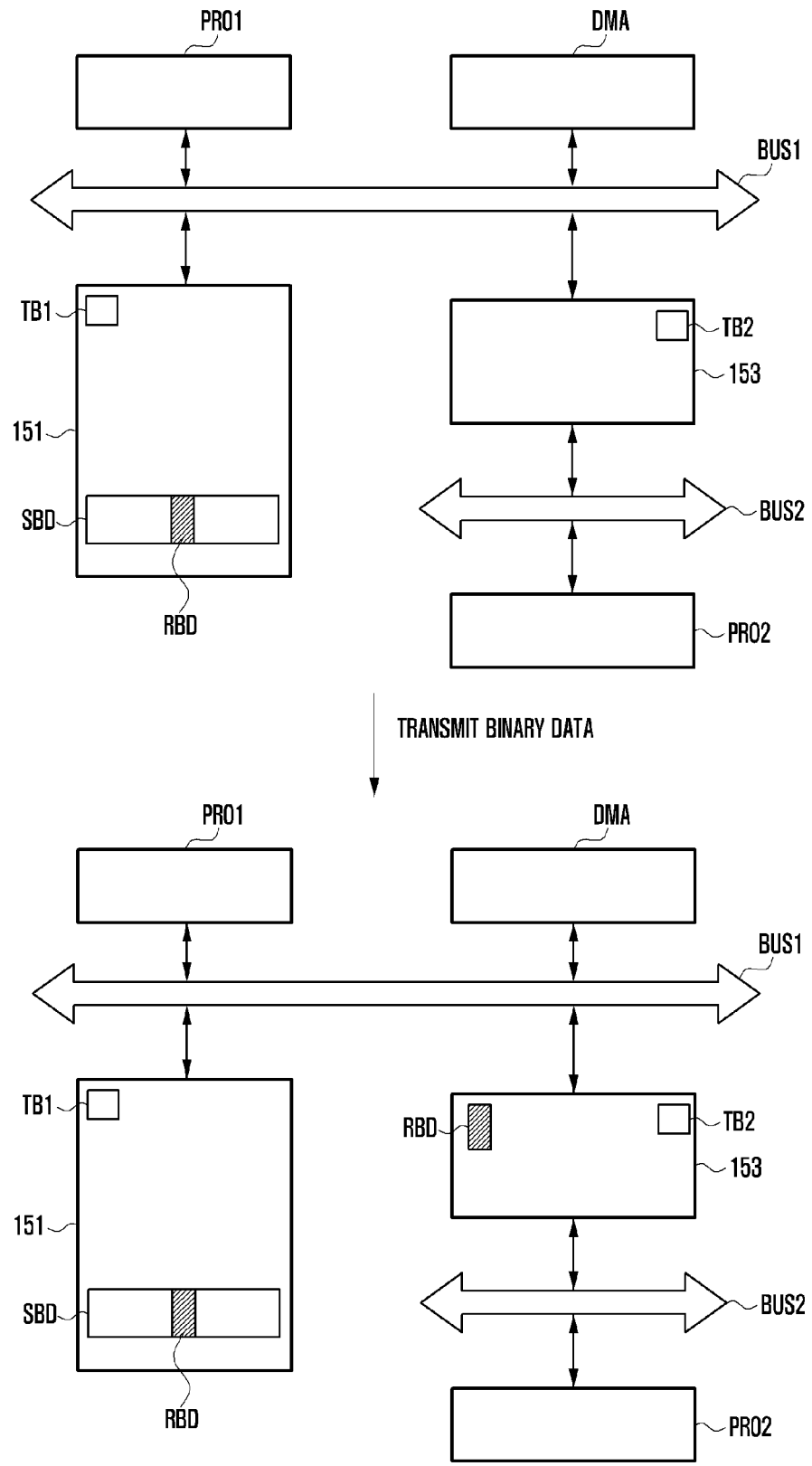
FIG. 7 is a diagram illustrating an example of a memory management process in accordance with an embodiment of this disclosure.

FIGS. 5 to 7 are diagrams illustrating an example of the memory management process in accordance with an embodiment of this disclosure.

Referring to FIG. 5, the first memory 151 stores binary data SBD for the second system (subsystem) and the first table TB1. The binary data SBD for the second system (subsystem) refers to binary data for the operations of the second system (subsystem) as described above. The first table TB1 refers to a table in which physical memory addresses of the binary data are mapped to functions used in the operations of the second system (subsystem), as described above.

For example, as shown in FIG. 6, the first table TB1 may include pieces of function identification information and entry items consisting of start addresses and end addresses at which binary data is stored. The entry items forming the first table TB1 are described below. A start address and end address at which binary data corresponding to a 'library-1' function is stored are '0x00010000' and '0x0001FFFF', respectively. A start address and end address at which binary data corresponding to a 'library-2' function is stored are '0x00020000' and '0x0002EEEE', respectively. A start address and end address at which binary data corresponding to a 'library-3' function is stored are '0x0002EEEF' and '0x00031000', respectively. A start address and end address at which binary data corresponding to a 'function-1' function is stored are '0x00031001' and '0x0003FFFF', respectively. A start address and end address at which binary data corresponding to a 'function-2' function is stored are '0x00040000' and '0x00042000', respectively. The main control unit 161 can check the location where binary data corresponding to a function requested by the sub-control unit 163 is stored through such a first table TB1.

Referring back to FIG. 5, the second memory 153 stores the second table TB2. The second table TB2 refers to a table indicating whether or not binary data corresponding to a function used in an operation of the second system (subsystem) is stored in the second memory 153, as described above. The sub-control unit 163 can determine whether or not binary data corresponding to a function is stored in the second memory 153 such a second table TB2. If it is determined that binary data corresponding to the function is not stored in the second memory 153, the sub-control unit 163 can request the binary data from the main control unit 161 by providing the main control unit 161 with information capable of identifying the function corresponding to the binary data.

Referring to FIG. 7, the sub-control unit 163 determines whether or not binary data corresponding to a function is present in the second memory 153 using the second table TB2 stored in the second memory 153. If it is determined that binary data corresponding to the function is present in the second memory 153, the sub-control unit 163 provides the main control unit 161 with information capable of identifying the function corresponding to the binary data.

In response thereto, the main control unit 161 checks the location where binary data corresponding to the function requested by the sub-control unit 163 is stored based on the first table TB1 stored in the first memory 151. Next, the main control unit 161 copies binary data RBD, corresponding to the function requested by the sub-control unit 163, to the second memory 153 through the first processor PRO1 or the DMA controller DMA.

The sub-control unit 163 drives the second system (subsystem) based on the binary data RBD copied to the second memory 153 and updates the second table TB2 stored in the second memory 153.

In accordance with this disclosure, binary data for the second system (subsystem) is stored in the first memory 151 used in the first system (main system), and binary data is copied to the second memory 153 in response to a request from the second system (subsystem). Accordingly, a new operation of the second system (subsystem) which may occur in the future can be performed using the second memory 153 having a relatively smaller memory capacity than the first memory 151. Furthermore, consumed current can be reduced because the size of the second memory 153 can be reduced when designing the second system (subsystem).

Meanwhile, in accordance with this disclosure, it has been illustrated that the first table is stored in the first memory 151 used in the first system (main system) and the main control unit 161 checks the location where binary data corresponding to a function requested by the sub-control unit 163 is stored based on the first table stored in the first memory 151, but this disclosure is not limited thereto. In some embodiments, the first table may be stored in the second memory 153 used in the second system (subsystem). In this case, if binary data corresponding to a function is not present in the second memory 153, the sub-control unit 163 may check the location where the binary data is stored using the first table stored in the second memory 153 and request the binary data from the main control unit 161 by providing the main control unit 161 with information about the location where the binary data is stored. In response to the request, the main control unit 161 copies the binary data to the second memory 153 based on the location information received from the sub-control unit 163. Here, if the first system (main system) has entered a sleep mode, the DMA controller may be activated, while the first processor remains inactivated. Since the sub-control unit 163 is aware of the location where the binary data is stored, the main control unit 161 can copy the binary data to the second memory 153 when the DMA controller has been activated.

Furthermore, if an available memory capacity of the second memory 153 is smaller than a predetermined memory capacity in the state in which the first table has been stored in the second memory 153, the first table stored in the second memory 153 can be moved to the first memory 151. In this case, a memory management process in accordance with this disclosure is performed as described above.

Furthermore, the control unit 160, the main control unit 161, and the sub-control unit 163 in accordance with an embodiment of this disclosure have been illustrated as being implemented using separate blocks and the blocks have been illustrated as performing different functions, but this is for convenience of description. The functions of the blocks do not need to be separately classified as described above.

In accordance with this disclosure, binary data for the second system (subsystem) is stored in the first memory 151 used in the first system (main system), and binary data is copied to the second memory 153 in response to a request from the second system (subsystem). Accordingly, a new operation of the second system (subsystem) which may occur in the future can be performed using the second memory 153 having a relatively smaller memory capacity than the first memory 151.

Furthermore, consumed current can be reduced because the size of the second memory 153 can be reduced when designing the second system (subsystem).

Meanwhile, the embodiments disclosed in the present specification and drawings are illustrated to present specific examples in order to clarify the technical contents of this disclosure and help understanding of this disclosure, but are not intended to limit the scope of this disclosure. It will be evident to those skilled in the art that various implementations based on the technical aspects of this disclosure are possible in addition to the disclosed embodiments.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

The functions and process steps herein may be performed automatically or wholly or partially in response to user command. An activity (including a step) performed automatically is performed in response to executable instruction or device operation without user direct initiation of the activity.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

What is claimed is:

1. A memory management apparatus of an electronic device, comprising:
   a main system including a first processor and a first memory, the main system configured to enter into a sleep mode; and
   a sub system including a second processor and a second memory, the sub system configured to:
      detect whether an instruction necessary to operate a function of the electronic device is stored in the second memory;
      in response to a failure to detect the instruction, cause at least a portion of the main system to temporarily exit the sleep mode, retrieve the instruction from the first memory based on a first table indicating a physical memory address of the instruction, and transfer the retrieved instruction to the second memory for storage; and
      operate the function of the electronic device according to the instruction while the main system is in the sleep mode,
   wherein the sub system utilizes less power than the main system.

2. The memory management apparatus of claim 1, the at least a portion of the main system further comprising a direct memory access controller, wherein the sub system is configured to cause the direct memory access controller to exit the sleep mode and transfer the instruction from the first memory to the second memory without activating the first processor.

3. The memory management apparatus of claim 1, wherein the sub system causes the main system to transfer the instruction from the first memory to the second memory by transmitting an instruction identification to the main system, wherein:
   the first table in the first memory maps the instruction identification to the physical memory address of the instruction stored in the first memory.

4. The memory management apparatus of claim 1, wherein the function of the electronic device includes a sensor function that is at least one of an acceleration sensor, a motion sensor, a geomagnetic sensor, a temperature sensor, a humidity sensor, an atmospheric pressure sensor, a pressure sensor, a gravity sensor, and a position sensor.

5. The memory management apparatus of claim 1, wherein the sub system is further configured to detect when the instruction is stored in the second memory by querying a second table mapping an instruction identification to a physical memory address in the second memory.

6. A method of managing memory in an electronic device, comprising:
- activating a sleep mode for a main system having a first memory;
- detecting, via a sub system having a second memory, whether an instruction necessary to operate a function of the electronic device is stored in the second memory;
- in response to a failure to detect the instruction, causing, via the sub system, at least part of the main system to temporarily exit the sleep mode, retrieve the instruction from the first memory based on a first table indicating a physical memory address of the instruction, and transfer the instruction to the second memory for storage; and
- operating, via the sub system, the function according to the instruction while the main system is in the sleep mode,
- wherein the sub system utilizes less power than the main system.

7. The method of claim 6, wherein the at least part of the main system is a direct memory access controller, the method further comprising:
- instructing, via the sub system, the direct memory access controller to exit the sleep mode; and
- transferring, by the direct memory access controller, the instruction from the first memory to the second memory without activating a first processor of the main system.

8. The method of claim 6, wherein the at least part of the main system transfers the instruction from the first memory to the second memory by transmitting, via the sub system, an instruction identification to the main system,
- wherein the first table indicates the physical memory address by mapping the instruction identification to the physical memory address of the instruction stored in the first memory.

9. The method of claim 6, wherein the function of the electronic device includes a sensor function that is at least one of an acceleration sensor, a motion sensor, a geomagnetic sensor, a temperature sensor, a humidity sensor, an atmospheric pressure sensor, a pressure sensor, a gravity sensor, and a position sensor.

10. The method of claim 6, further comprising:
- detecting, via the sub system, whether the instruction is stored in the second memory by querying a second table mapping an instruction identification to a physical memory address in the second memory.

11. A non-transitory computer medium for managing memory in an electronic device, comprising program instructions executable by a processor to:
- activate a sleep mode for a main system having a first memory;
- detect, via a sub system having a second memory, whether an instruction necessary to operate a function of the electronic device is stored in the second memory;
- in response to a failure to detect the instruction, cause, via the sub system, at least part of the main system to temporarily exit the sleep mode, retrieve the instruction from the first memory based on a first table indicating a physical memory address of the instruction, and transfer the instruction to the second memory for storage; and
- operate, via the sub system, the function according to the instruction while the main system is in the sleep mode,
- wherein the sub system utilizes less power than the main system.

12. The non-transitory computer medium of claim 11, wherein when the at least part of the main system to temporarily exit the sleep mode is a direct memory access controller, the instructions further comprise:
- instructing, via the sub system, the direct memory access controller to exit the sleep mode; and
- transferring, by the direct memory access controller, the instruction from the first memory to the second memory without activating a first processor of the main system.

13. The non-transitory computer medium of claim 11, wherein the at least part of the main system transfers the instruction from the first memory to the second memory by transmitting, via the sub system, an instruction identification to the main system,
- wherein the first table indicates the physical memory address by mapping the instruction identification to the physical memory address in the first memory.

14. The non-transitory computer medium of claim 11, wherein the function of the electronic device includes a sensor function that is at least one of an acceleration sensor, a motion sensor, a geomagnetic sensor, a temperature sensor, a humidity sensor, an atmospheric pressure sensor, a pressure sensor, a gravity sensor, and a position sensor.

15. The non-transitory computer medium of claim 11, the program instructions further comprising:
- detecting, via the sub system, whether the instruction is stored in the second memory by querying a second table mapping an instruction identification to a physical memory address in the second memory.

* * * * *